Oct. 4, 1932.                C. L. FALK                1,881,070
                              VEHICLE
                       Filed Dec. 3, 1929        2 Sheets-Sheet 1
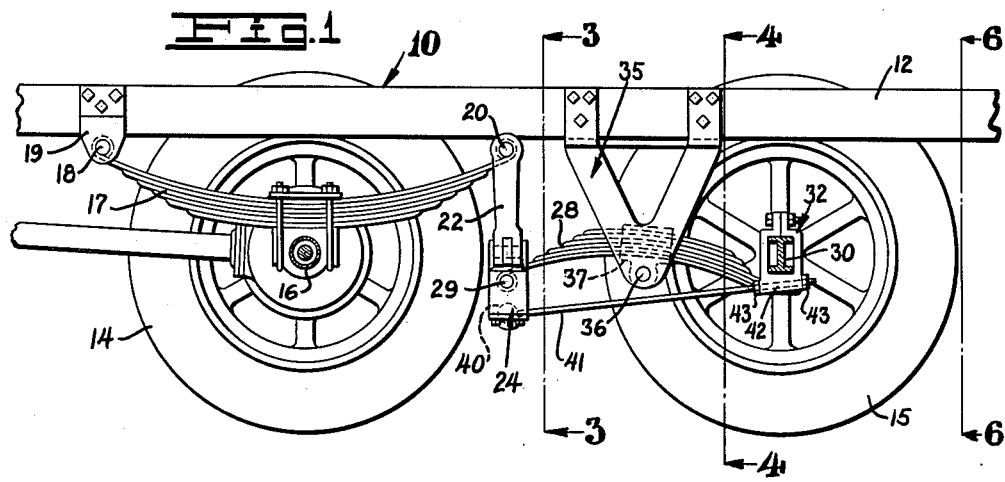
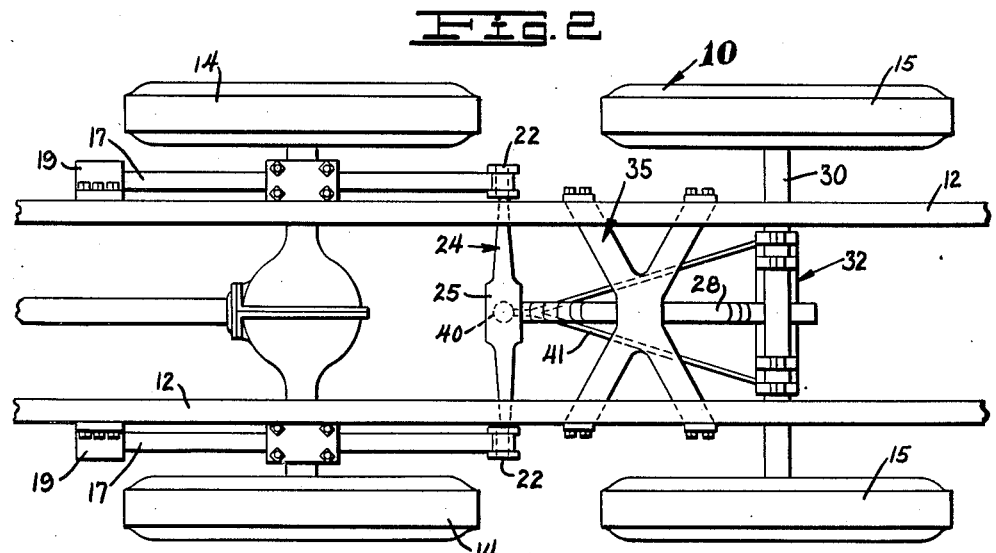
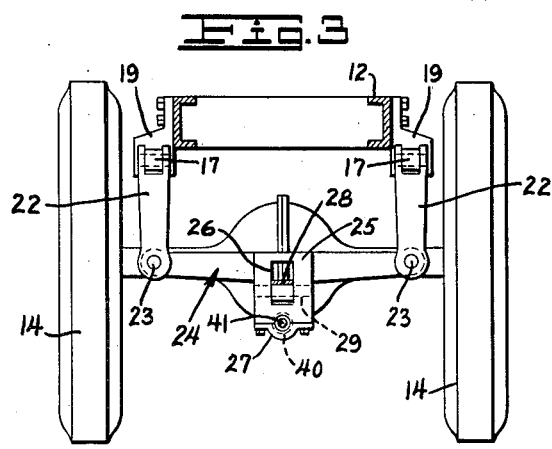
INVENTOR.
C. L. FALK
BY
B. J. Craig
ATTORNEY.

Oct. 4, 1932.  C. L. FALK  1,881,070
VEHICLE
Filed Dec. 3, 1929  2 Sheets-Sheet 2
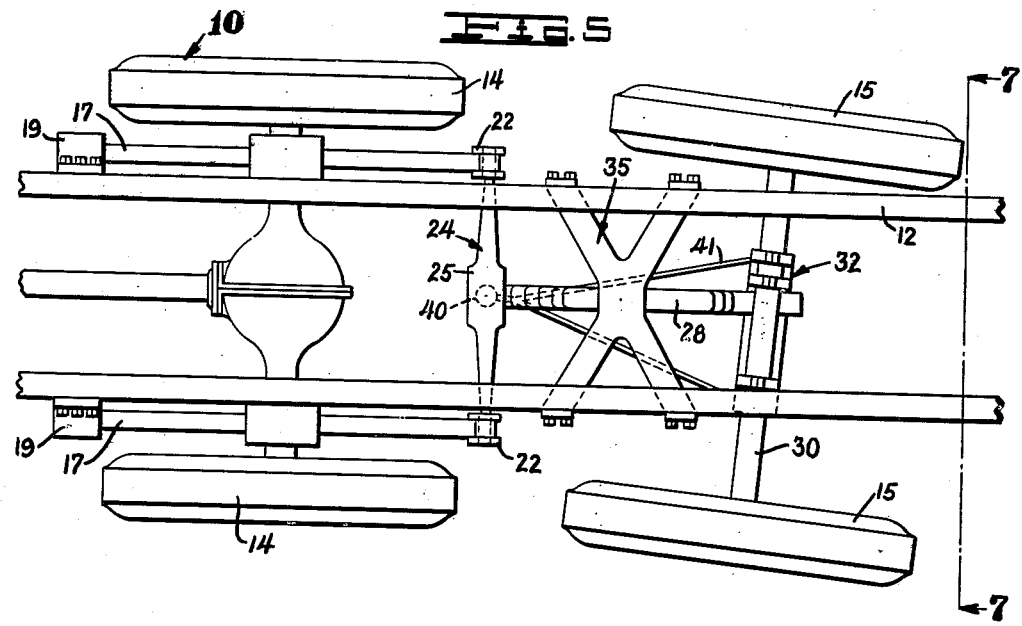
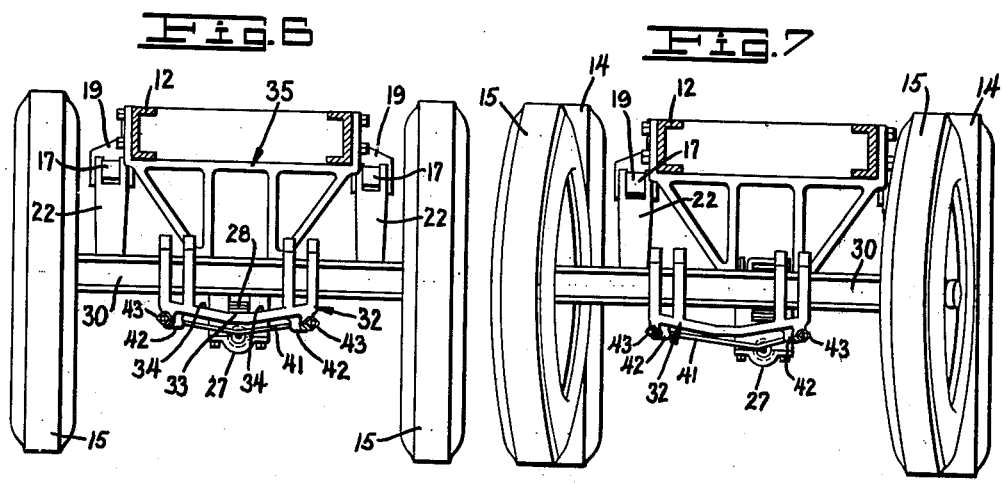
INVENTOR.
C. L. FALK.
BY
B. J. Craig
ATTORNEY.

Patented Oct. 4, 1932

1,881,070

UNITED STATES PATENT OFFICE

CLINTON L. FALK, OF LOS ANGELES, CALIFORNIA

VEHICLE

Application filed December 3, 1929. Serial No. 411,285.

This invention relates to improvements in vehicles.

The general object of the invention is to provide an improved spring suspension means for a vehicle such as a motor truck which includes two pairs of rear wheels.

A more specific object of my invention is to provide an improved mounting for a pair of the rear wheels of a six wheeled vehicle.

Another object of the invention is to provide a vehicle having two pairs of rear wheels wherein the axle of the forward set of wheels is fixed relative to the movement transverse of the vehicle chassis and the axle of the rearward set of wheels is movable transversely of the chassis whereupon a turning of the vehicle the rearward set of wheels will shift and upon the vehicle again following a straight course the rear set of wheels will automatically align themselves.

A further object of the invention is to provide an auxiliary pair of wheels and spring suspension mechanism which may be readily placed in operation on a standard four wheel truck.

Other objects of this invention will be apparent from the following description taken in connection with the accompanying drawings wherein:

Fig. 1 is a fragmentary side view of the rear of a vehicle showing the rear sets of wheels with the rear wheels on one side removed.

Fig. 2 is a fragmentary top plan view of a portion of a vehicle equipped with my invention.

Fig. 3 is a section taken on line 3—3 of Fig. 1.

Fig. 4 is a fragmentary section taken on line 4—4 of Fig. 1.

Fig. 5 is a view similar to Fig. 2 showing the position of the rear pair of wheels when the vehicle is turning.

Fig. 6 is a section taken on line 6—6 of Fig. 1.

Fig. 7 is a section taken on line 7—7 of Fig. 5.

Referring to the drawings by reference characters I have indicated a motor truck generally at 10 which includes a frame 12, a pair of rear driving wheels 14, and a pair of auxiliary wheels 15.

Although I describe my invention as embodied in a truck it will be understood that it may well be embodied in a trailer or in other manner without departing from the inventive features.

The drive wheels 14 are shown as supported on an axle 16 and secured to the axle 16 adjacent each of the wheels 14 I provide a leaf spring 17. Each of the springs 17 are secured intermediate their length to the axle 16 and at the forward end they are pivotally secured as at 18 to brackets 19 secured to the frame 12.

The rearward end of each spring 17 is pivotally connected as at 20 to a downwardly extending arm 22 each of which are pivotally connected as at 23 to a cross member 24. At the center of the cross member 24 I secure a supporting bracket 25 in which I provide an aperture 26, and at the bottom of the bracket 25 I provide a ball socket 27. One end of a leaf spring 28 is positioned in the aperture 26 and pivotally secured to the bracket 25 as at 29.

The auxiliary wheels 15 are shown as rotatably mounted on an axle 30 and secured to this axle intermediate the length thereof I provide a yoke, 32. This yoke includes a seat portion 33 spaced below the under side of the axle 30 and on each side of the seat 33 I provide track portions 34 which are inclined upwardly from the seat towards their outer ends.

The rear end portion of the spring 28 is adapted, when in a normal position, to rest freely on the seat 33 of the yoke 32.

Intermediate the auxiliary axle 30 and the cross member 24 I provide a downwardly extending hanger 35 which is secured to the frame 12. Pivotally secured to the lower end of the hanger 35 as at 36 I provide a cradle 37 to which the spring 28 is secured intermediate its length by a plurality of U bolts 38 and nuts 39.

Positioned in the ball socket 27 of the cross member 24 I provide a ball 40 which includes a rearwardly extending wish-bone radius rod 41, each rearward end of which is positioned in an apertured boss 42 on the yoke 32 and secured in position by nuts 43.

When the vehicle 10 is progressing on a straight course the auxiliary wheels 15 follow a straight course behind the rear wheels 14 as shown in Fig. 2, and the rear end of the spring 28 rests on the seat 33 of the yoke 32 as shown in Fig. 6, but when the vehicle turns to either side the auxiliary wheels 15 and the axle 30 shift relative to the frame 12 as shown in Fig. 5, and the rear end of the spring 28 rides on one of the track portions 34 of the yoke 32 as shown in Fig. 7. When the vehicle again pursues a straight course the auxiliary wheels 15 automatically return to their normal position as shown in Fig. 2.

When both of the auxiliary wheels 15 rise relative to the frame 12 such as when riding over an obstruction or bump in the road, they move upwardly through an arc about the center of the ball 40 and the spring 28 pivots about the axis of the pivot 36 thereby moving the cross member 24 downwardly and through the arms 22 distributing a portion of the shock to the springs 17.

When only one of the auxiliary wheels 15 rises relative to the frame 12 the auxiliary axle 30 tilts and only raises the rear end of the spring 28 half the distance it is raised when both auxiliary wheels rise.

When both the rear wheels 14 rise such as when passing over an obstruction the rear ends of the springs 17 rise and through the medium of the arms 12 raise the cross member 24 thereby raising the forward end of the spring 28 and distributing part of the shock to the spring 28.

When only one of the rear wheels 14 rises the cross member 24 tilts and raises the forward end of the spring 28 only half the distance it raises when both rear wheels 14 rise.

Throughout all of the operations the vertical movement of the load is kept at a minimum so that the tractive effort required to pull the vehicle is only slightly increased by rough and bumpy roads.

For exceptionally heavy load carrying vehicles two springs similar to the spring 28 may be provided. In this case the two springs are positioned side by side and the portion 25 of the cross member 24, the bracket 35 and the seat 33 and tracks 34 are made to accommodate the two springs.

From the foregoing description it will be apparent that I have provided a novel spring suspension means for vehicles which is simple in construction and highly efficient in operation.

What I claim is:

1. In a vehicle, a frame, a pair of wheels, means to mount said wheels on said frame, an equalizing cross member resiliently associated with said frame, a pair of auxiliary wheels, said wheels being mounted on an axle, an auxiliary spring, means to support said auxiliary spring intermediate its length, said auxiliary axle including a seat portion, one end of said auxiliary spring engaging said cross member and the opposite end of said auxiliary spring engaging said seat portion and means to prevent bodily rearward movement of said auxiliary axle.

2. In a vehicle, a frame, a pair of wheels, an axle connecting said wheels, springs connecting said axle to said frame, a cross member, a pair of auxiliary wheels, said wheels being mounted on an axle, means to connect said second axle to said cross member, an auxiliary spring, said spring being positioned intermediate the width of said frame, means to support said auxiliary spring intermediate its length, said auxiliary axle including a seat portion and one end of said auxiliary spring engaging said cross member and the opposite end of said auxiliary spring engaging said seat portion.

3. In a vehicle, a frame, a pair of wheels, means connecting said wheels, a leaf spring adjacent each of said wheels, one end of each of said springs being pivotally connected to said frame, a cross member connected to said springs, a pair of auxiliary wheels, said wheels being mounted on an axle, means to connect said auxiliary axle to said cross member, an auxiliary spring, said spring being positioned intermediate the width of said frame, means to support said auxiliary spring intermediate its length, a seat carried by said auxiliary axle, one end of said auxiliary spring being connected to said cross member and the other end of said auxiliary spring being adapted to rest on said seat.

4. In a vehicle, a frame, a pair of wheels, means connecting said wheels to said frame, a cross member, means to support said cross member, a pair of auxiliary wheels, said wheels being mounted on an axle, an auxiliary spring, said spring being positioned intermediate the width of said frame, means to support said auxiliary spring intermediate its length, said auxiliary axle including a yoke having a seat portion, one end of said auxiliary spring shiftably engaging said seat portion and means to support the other end of said auxiliary spring and means to connect said auxiliary axle to said supporting means.

5. In a vehicle, a frame, a pair of wheels, means connecting said wheels, a leaf spring adjacent each of said wheels and pivotally connected to said frame, an arm pivotally connected to the opposite end of each of said springs, a cross member pivotally connected to said arms, a pair of auxiliary wheels, said wheels being mounted on an axle, means to connect said auxiliary axle to said cross member, an auxiliary spring, said spring being positioned intermediate the width of said frame, means to support said auxiliary spring intermediate its length, said auxiliary axle including a yoke having a seat portion and having an inclined track portion on each side thereof, one end of said auxiliary spring engaging said cross member and the opposite end of said auxiliary spring engaging said seat portion.

6. In a vehicle, a frame, a pair of wheels, means connecting said wheels to said frame, a pair of auxiliary wheels, said wheels being mounted on an axle, an auxiliary spring, said spring being positioned intermediate the width of said frame, means to support said auxiliary spring intermediate its length, said auxiliary axle including a yoke having a seat portion and having an inclined track portion on each side thereof, one end of said auxiliary spring engaging said seat of said yoke and means to support the other end of said auxiliary spring and means to prevent bodily longitudinal movement of said axle relative to said frame.

7. In a vehicle, a frame, a pair of wheels, means connecting said wheels, a leaf spring secured to said means adjacent each of said wheels, one end of each of said springs being pivotally connected to said frame, a downwardly extending arm pivotally connected to the opposite end of each of said springs, a cross member pivotally connected to said arms, a pair of auxiliary wheels, said wheels being mounted on an axle, means connecting said axle to said cross member, an auxiliary spring positioned intermediate the width of said frame, means to support said auxiliary spring, a yoke carried by said auxiliary axle, said yoke including a seat portion having an upwardly inclined track portion on each side thereof, said seat and said track portion being spaced below the lower face of said auxiliary axle, one end of said auxiliary spring being pivotally secured to said cross member and the opposite end of said auxiliary spring being adapted to rest on said seat of said auxiliary axle yoke.

8. In a vehicle, a frame, a pair of wheels, means connecting said wheels, a leaf spring secured to said means adjacent each of said wheels, one end of each of said springs being connected to said frame, a cross member connected to each of said springs, a pair of auxiliary wheels, said wheels being mounted on an axle, means connecting said axle and cross member, an auxiliary spring, said spring being positioned intermediate the width of said frame, a hanger secured to said frame intermediate said cross member, and said auxiliary wheels, a cradle secured to said hanger, said auxiliary spring being secured intermediate its length to said cradle, a yoke carried by said auxiliary axle, said yoke including a seat portion having an upwardly inclined track portion on each side thereof, said seat and said track portion being spaced below the lower face of said auxiliary axle, one end of said auxiliary spring being adapted to rest on said seat of said yoke.

9. In a vehicle, a frame, a pair of wheels, means connecting said wheels, a leaf spring secured to said means adjacent each of said wheels, one end of each of said springs being pivotally connected to said frame, an arm pivotally connected to the opposite end of each of said springs, a cross member pivotally connected to said arms, a pair of auxiliary wheels, said wheels being mounted on an axle, means connecting said axle and cross member, an auxiliary spring, said spring being positioned intermediate the width of said frame, a hanger secured to said frame intermediate said cross member and said auxiliary axle, said auxiliary spring being pivotally connected intermediate its length to said hanger, a yoke having an upwardly inclined track portion on each side thereof, and carried by said auxiliary axle, said seat and said track portion being spaced below the lower face of said auxiliary axle, one end of said auxiliary spring being pivotally secured to said cross member and the opposite end of said auxiliary spring being adapted to rest on said seat.

10. In a vehicle, a frame, a pair of wheels, means connecting said wheels, a leaf spring secured to said means adjacent each of said wheels, one end of each of said springs being pivotally connected to said frame, a downwardly extending arm pivotally connected to the opposite end of each of said springs, a cross member pivotally connected to said arms, a pair of auxiliary wheels, said wheels being mounted on an axle, means connecting said axle and said cross member, an auxiliary spring supported intermediate the width of said frame, a yoke carried by said auxiliary axle, said yoke including a seat portion having an upwardly inclined track portion on each side thereof, one end of said auxiliary spring being pivotally secured to said cross member and the opposite end of said auxiliary spring being adapted to rest on said seat of said auxiliary axle yoke.

11. In a vehicle, a frame, a pair of wheels, means connecting said wheels, a leaf spring secured to said means adjacent each of said wheels, one end of each of said springs being pivotally connected to said frame, a downwardly extending arm pivotally connected to the opposite end of each of said springs, a cross member pivotally connected to said arms, a pair of auxiliary wheels, said wheels being mounted on an axle, means connecting said axle and said cross member, an auxiliary spring, said spring being positioned intermediate the width of said frame, a hanger secured to said frame intermediate said cross member and said auxiliary wheels, a cradle pivotally secured to said hanger, said auxiliary spring being secured intermediate its length to said cradle, a yoke carried by said auxiliary axle, said yoke including a seat portion having an upwardly inclined track portion on each side thereof, said seat and said track portion being spaced below the lower face of said auxiliary axle, one end of said auxiliary spring being adapted to rest on said seat of said yoke and a radius rod connecting said cross member and said yoke.

12. In a vehicle, a frame, a pair of wheels, means connecting said wheels, a leaf spring secured to said means adjacent each of said wheels, one end of each of said springs being pivotally connected to said frame, a downwardly extending arm pivotally connected to the opposite end of said springs, a cross member pivotally connected to said arms, a pair of auxiliary wheels, said wheels being mounted on an axle, means connecting said axle and cross member, an auxiliary spring, said spring being positioned intermediate the width of said frame, a hanger secured to said frame intermediate said cross member and said auxiliary axle, a cradle pivotally secured to said hanger, said auxiliary spring being secured intermediate its length to said cradle, a yoke carried by said auxiliary axle, said yoke including a seat portion having an upwardly inclined track portion on each side thereof, said seat and said track portion being spaced below the lower face of said auxiliary axle, one end of said auxiliary spring being pivotally secured to said cross member and the opposite end of said auxiliary spring being adapted to rest on said seat of said auxiliary axle yoke.

13. In a vehicle, a frame, a pair of wheels, means connecting said wheels, a leaf spring secured to said means adjacent said wheels, one end of each of said springs being pivotally connected to said frame, an arm pivotally connected to the opposite end of each of said springs, a cross member pivotally connected to said arms, a pair of auxiliary wheels, said wheels being mounted on an axle, an auxiliary spring, said spring being positioned intermediate the width of said frame, means to support said auxiliary spring intermediate its length, said auxiliary axle including a yoke having a seat portion and having an inclined track portion on each side thereof, said seat and said track portion being spaced below the lower face of said auxiliary axle, one end of said auxiliary spring engaging said cross member and the opposite end of said auxiliary spring engaging said seat of said yoke, said cross member including a ball socket, a ball in said socket, said ball including a wish bone radius rod, the free ends of said radius rod being secured to said yoke.

14. In a vehicle, a frame, a pair of wheels, means connecting said wheels, a leaf spring secured to said means adjacent each of said wheels, one end of each of said springs being pivotally connected to said frame, a downwardly extending arm pivotally connected to the opposite end of each of said springs, a cross member pivotally connected to said arms, a pair of auxiliary wheels, said wheels being mounted on an axle, an auxiliary spring, said spring being positioned intermediate the width of said frame, a hanger secured to said frame intermediate said cross member and said auxiliary wheel axle, a cradle pivotally secured to said hanger, said auxiliary spring being secured intermediate its length to said cradle, a yoke carried by said auxiliary axle, said yoke including a seat portion having an upwardly inclined track portion on each side thereof, said seat portion and said track portion being spaced below the lower face of said auxiliary axle, one end of said auxiliary spring being pivotally secured to said cross member and the opposite end of said auxiliary spring being adapted to rest on said seat of said yoke, said cross member including a ball socket below said spring pivot, a ball in said socket, said ball including a wishbone radius rod, the free ends of said radius rod being secured to said auxiliary axle yoke.

15. In a vehicle, a frame, a pair of wheels mounted on an axle, a resilient connection to connect said axle to said frame under one end thereof, an equalizing cross member connected with a portion of said resilient connection, but movable as to its position with respect to said frame, a second pair of wheels and an axle therefor, said second axle including a seat portion connected thereto, means to control transverse movement of said axle relative to said frame when said vehicle is operating, a spring equalizing member pivotally supported intermediate its length to rock over its pivot but restrained to remain parallel with the side frame members, means to support said spring member under the said frame intermediate its width, one end of said spring member being connected to said cross member and the other end engaging said seat portion of said second axle.

In testimony whereof, I hereunto affix my signature.

CLINTON L. FALK.